United States Patent
Close

(10) Patent No.: US 7,881,155 B2
(45) Date of Patent: Feb. 1, 2011

(54) PRESSURE RELEASE ENCODING SYSTEM FOR COMMUNICATING DOWNHOLE INFORMATION THROUGH A WELLBORE TO A SURFACE LOCATION

(75) Inventor: David Close, Austin, TX (US)

(73) Assignee: Welltronics Applications LLC, Austin, TX (US)

( * ) Notice: Subject to any disclaimer, the term of this patent is extended or adjusted under 35 U.S.C. 154(b) by 0 days.

(21) Appl. No.: 12/685,602

(22) Filed: Jan. 11, 2010

(65) Prior Publication Data

US 2010/0110833 A1 May 6, 2010

Related U.S. Application Data

(63) Continuation-in-part of application No. 11/460,180, filed on Jul. 26, 2006, now Pat. No. 7,646,310.

(51) Int. Cl.
 *E21B 47/16* (2006.01)
(52) U.S. Cl. ............... 367/83; 367/84; 367/85; 340/853.1; 340/854.3; 175/48; 175/61
(58) Field of Classification Search ............. 367/82–85; 340/853.1, 854.3; 175/48, 61
 See application file for complete search history.

(56) References Cited

U.S. PATENT DOCUMENTS

| | | | |
|---|---|---|---|
| 3,867,714 A | 2/1975 | Patton | |
| 4,520,468 A | 5/1985 | Scherbatskoy | |
| 4,562,560 A | 12/1985 | Kamp | |
| 5,473,579 A * | 12/1995 | Jeter | 367/85 |
| 5,586,084 A * | 12/1996 | Barron et al. | 367/85 |
| 5,679,894 A | 10/1997 | Kruger et al. | |
| 6,097,310 A * | 8/2000 | Harrell et al. | 340/854.3 |
| 6,105,690 A | 8/2000 | Biglin, Jr. | |
| 6,443,228 B1 | 9/2002 | Aronstam et al. | |
| 6,691,804 B2 | 2/2004 | Harrison | |
| 6,714,138 B1 | 3/2004 | Turner et al. | |
| 6,898,150 B2 | 5/2005 | Hahn | |
| 7,145,834 B1 * | 12/2006 | Jeter | 367/83 |
| 7,319,638 B2 * | 1/2008 | Collette | 367/83 |
| 7,417,920 B2 * | 8/2008 | Hahn et al. | 367/85 |

* cited by examiner

*Primary Examiner*—Albert K Wong
(74) *Attorney, Agent, or Firm*—Craft Chu PLLC; Andrew W. Chu, PC

(57) ABSTRACT

A pressure release encoding system for communicating downhole information through a wellbore to a surface location include a downhole tool with a valve for providing a fluid restriction to fluid passing in the wellbore, a sensor positioned in the wellbore for sensing a downhole condition in the wellbore, a brake cooperative with the valve for moving the valve between at least two positions in timed relation to the downhole condition sensed by the sensor, and a detector positioned at the surface location for providing a measurement value at the surface location correlative to the time between the changes of the pressure of the fluid in the wellbore. The system associates position of the valve with pressure transduction. The sensor is an inclination sensor for sensing an angle of inclination of the wellbore.

10 Claims, 4 Drawing Sheets

PRESSURE RELEASE ENCODING SYSTEM FOR COMMUNICATING DOWNHOLE INFORMATION THROUGH A WELLBORE TO A SURFACE LOCATION

CROSS-REFERENCE TO RELATED APPLICATIONS

The present application claims continuation-in-part priority under 35 U.S.C. §120 from U.S. Ser. No. 11/460,180, filed on Jul. 26, 2006, and entitled "SYSTEM FOR COMMUNICATING DOWNHOLE INFORMATION THROUGH A WELLBORE TO A SURFACE LOCATION".

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to a system and method for transmitting information from a downhole location to surface location. More particularly, the present invention relates to a system and method for communicating the inclination angle at the bottom of a wellbore to a surface location in a generally real-time fashion without the need for wirelines or remote transmission. The present invention also relates to the association of pressure transducer measurements to monitor pressure changes as a method of transmission of information.

2. Description of Related Art Including Information Disclosed Under 37 CFR 1.97 and 37 CFR 1.98.

In underground drilling, such as gas, oil or geothermal drilling, a bore is drilled through a formation deep in the earth. Such bores are formed by connecting a drill bit to sections of long pipe, referred to as a "drill pipe," so as to form an assembly commonly referred to as a "drill string" that extends from the surface to the bottom of the borehole. The drill bit is rotated so that it advances into the earth, thereby forming the bore. In rotary drilling, the drill bit is rotated by rotating the drill string at the surface. In directional drilling, the drill bit is rotated by a downhole mud motor coupled to the drill bit; the remainder of the drill string is not rotated during drilling. In a steerable drill string, the mud motor is bent at a slight angle to the centerline of the drill bit so as to create a side force that directs the path of the drill bit away from a straight line. In any event, in order to lubricate the drill bit and flush cuttings from its path pumps on the surface pump fluid at a high pressure, referred to as "drilling mud", through an internal passage in the drill string and out through the drill bit. The drilling mud then flows to the surface through the annular passage formed between the drill string and the cut formation borehole.

Depending on the drilling operation, the pressure of the drilling mud flowing through the drill string will typically be between 500 psi and 5000 psi. Some of this pressure is lost at the drill bit so that the pressure of the drilling mud flowing outside the drill string is less than that flowing inside the drill string. In addition, the components of the drill string are also subjected to wear and abrasion from drilling mud, as well as the vibration of the drill string.

The distal end of a drill string is the bottom hole assembly (BHA), which includes the drill bit, the drilling sub and drill collars. In "measurement while drilling" (MWD) applications, sensing modules in the BHA provide information concerning the direction of the drilling. This information can be used, for example, to control the direction in which the drill bit advances in a steerable drill string. Such sensors may include a magnetometer to sense azimuth and accelerometers to sense inclination and tool face direction.

Historically, information concerning the conditions in the well, such as information about the formation being drilled through, was obtained by stopping drilling, removing the drill string, and lowering sensors into the bore using a wireline cable, which were then retrieved after the measurements had been taken. This approach was known as wireline logging. More recently, sensing modules have been incorporated into the BHA to provide the drill operator with essentially real-time information concerning one or more aspects of the drilling operation as the drilling progresses. In "logging while drilling" (LWD) applications, the drilling aspects about which information is supplied comprise characteristics of the formation being drilled through. For example, resistivity sensors may be used to transmit, and then receive, high frequency wavelength signals (e.g., electromagnetic waves) that travel through the formation surrounding the sensor. By comparing the transmitted and received signals, information can be determined concerning the nature of the formation through which the signal traveled, such as whether it contains water or hydrocarbons. Other sensors are used in conjunction with magnetic resonance imaging (MRI). Still other sensors include gamma scintillators, which are used to determine the natural radioactivity of the formation, and nuclear detectors, which are used to determine the porosity and density of the formation.

In traditional LWD and MWD systems, electrical power is supplied by a turbine driven by the mud flow. More recently, battery modules have been developed that are incorporated into the BHA to provide electrical power.

In both LWD and MWD systems, the information collected by the sensors must be transmitted to the surface, where it can be analyzed. Such data transmission is typically accomplished using a technique referred to as "mud pulse telemetry." In a mud pulse telemetry system, signals from the sensor modules are typically received and processed in a microprocessor-based data encoder embodied in a collar as part of the BHA, which digitally encodes the sensor data. A controller in the control module then actuates a pulser, also incorporated into the BHA that generates pressure pulses within the flow of drilling mud that contains the encoded information. The pressure pulses are defined by a variety of characteristics, including amplitude (the difference between the maximum and minimum values of the pressure), duration (the time interval during which the pressure is increased), shape, and frequency (the number of pulses per unit time). Various encoding systems have been developed using one or more pressure pulse characteristics to represent binary data (i.e., bit 1 or 0)—for example, a pressure pulse of 0.5 second duration represents binary 1, while a pressure pulse of 1.0 second duration represents binary 0. The pressure pulses travel up the column of drilling mud flowing down to the drill bit, where they are sensed by a strain gauge-based pressure transducer. The data from the pressure transducer are then decoded and analyzed by the drilling rig operating personnel.

In the past, various patents have issued relating to the transmission of downhole conditions to a surface location. U.S. Pat. No. 3,867,714, issued on Feb. 18, 1975 to B. J. Patton, describes a logging-while-drilling (LWD) system, which is positioned within the drill string of a well drilling apparatus. The system includes a tool which has a turbine-like, signal-generating valve which rotates to generate a pressure wave signal in the drilling fluid which is representative of a measured downhole condition.

U.S. Pat. No. 4,520,468, issued on May 28, 1985 to S. A. Scherbatskoy, provides measurement-while-drilling (MWD) systems. The measurements are transmitted to the earth by a pulser, which produces common responses to electrical signals from a measuring instrument, and pressure pulses in the drilling fluid which are detected and decoded at the surface of the earth. The pulser is mounted in a special pulser sub which is of short length and enlarged internal diameter compared to the standard drill pipe and which is threadedly secured at each end to the drill string. An elongated housing is supported by the pulser sub. This elongated housing contains instrumentation or batteries and is connected to the pulser.

U.S. Pat. No. 4,562,560, issued on Dec. 31, 1985 to A. W. Kamp, provides a method and means for transmitting data through a drill string in a borehole. The data is in the form of pressure waves (such as pressure pulses) which are generated by means of a downhole mud motor that is driven by the drilling mud. The pressure waves are generated by varying the load on the mud motor according to a predetermined pattern that is representative of the data to be transmitted.

U.S. Pat. No. 5,679,894, issued on Oct. 21, 1997 to Kruger et al., describes a drilling system in which sensors are placed at selected locations in the drill string so as to continually measure various downhole operating parameters, including the differential pressure across the mud motor, rotational speed of the mud motor, torque, temperature, pressure differential between the fluid passing through the mud motor and the annulus between the drill string and the borehole, and the temperature of the circulating fluid. A downhole control circuit has a microprocessor so as to process signals from the sensors and transmit the process data uphole to a surface control unit by way of suitable telemetry.

U.S. Pat. No. 6,105,690, issued on Aug. 22, 2000 to Biglin, Jr. et al., provides a method and apparatus for communicating with a device downhole in a well, such as a sub in the BHA at the end of the drill string. Pressure pulses, such as those generated by the pistons of the mud pump, are transmitted through the drilling mud to a pressure pulsation sensor in the BHA. Based on its analysis of the pressure pulsations, the sensor can decipher a command from the surface so as to direct the steering of a steerable drill string.

U.S. Pat. No. 6,443,228, issued on Sep. 3, 2002 to Aronstam et al., is a method for utilizing flowable devices in wellbores. These flowable devices are used to provide communication between surface and the downhole instruments so as to establish a communication network in the wellbore. The flowable devices are adapted to move with a fluid flowing in the wellbore. The flowable device can be a memory device or a device that can provide a measurement of a parameter of interest. The flowable devices are introduced into the flow of a fluid flowing through a wellbore. The fluid moves the device in the wellbore. The flowable device is returned to the surface with the returning fluid.

U.S. Pat. No. 6,691,804, issued on Feb. 17, 2004 to W. H. Harrison, describes a directional borehole drilling system and method. Instrumentation located near the bit measures the present position when the bit is static and a dynamic tool face measures position when the bit is rotating. The data is processed to determine the error between present position and a desired trajectory.

U.S. Pat. No. 6,714,138, issued on Mar. 30, 2004 to Turner et al., discloses a method and apparatus for transmitting information to the surface from downhole in a well in which a pulser is incorporated into the BHA of a drill string, the pulser generating pressure coded pulses to contain information concerning the drilling operation. The pressure pulses travel to the surface where they are detected and decoded so as to decipher the information. The pulser includes a stator forming passages through which drilling fluid flows on its way to the drill bit. The rotor has blades that obstruct the flow of the drilling fluid through the passage when the rotor is rotated into a first orientation and when rotated into a second orientation, such that the oscillation of the rotor generates the encoded pressure pulses. An electric motor, under the operation of a controller, drives a drive train that oscillates the rotor between the first and second orientation. The controller controls one or more characteristics of the pressure pulses by varying the oscillation of the rotor. The controller may receive information concerning the characteristics of the pressure pulses from a pressure sensor mounted proximate to the BHA, as well as information concerning the angular orientation of the rotor by means of an encoder. The controller may also receive instructions for controlling the pressure pulse characteristics from the surface by means of encoded pressure pulses transmitted to the pulser from the surface that are sensed by the pressure sensor and decoded by the controller.

U.S. Pat. No. 6,898,150, issued on May 24, 2005 to Hahn, teaches a hydraulically balanced reciprocating pulser valve for mud pulse telemetry. Pressure fluctuations are generated by a reciprocating pulser system in a flowing drilling fluid. The system includes a reciprocating poppet and a stationary valve assembly with axial flow passages. The poppet reciprocates in close proximity to the valve assembly, at least partially blocking the flow through the valve assembly and generating oscillating pressure pulses. The poppet passes through two zero speed positions during each cycle, enabling rapid changes in signal phase, frequency, and/or amplitude thereby facilitating enhanced data encoding. The poppet is driven by a linear electric motor disposed in a lubricant filled housing.

Conventional downhole tools, MWD tools and steering tools typically will use a dedicated mud pulser (valve) that requires a large amount of power to actuate the valve and modulate the mud pressures in a manner that can be detected with a pressure transducer at the surface. These tools use mud pulsers or other means to generate oscillatory signals or mud pulses that create decreases and corresponding increases in the mud circulatory system. The significant proportion of the energy associated with conventional MWD pressure signals is the part of the signal waveform that increases the pressure of the system, whereas the part of the signal waveform that releases the system pressure uses a very small amount of energy. This invention capitalizes upon the energy savings associated with the pressure release encoded system that only releases pressures in the circulatory system as a transmission means. MWD tools are cost prohibitive as a means of transmitting the direction of the borehole when drilling vertical boreholes. Typically, periodic measurement of the "verticality of the well" is required by measuring the inclination of the borehole as the well is drilled deeper. Most vertically drilled wells use a cost-effective mechanical "drift indicator" that is lowered via a wireline into the well to make the inclination measurements at the required depth and pulled out of the hole to read the inclination. Mechanical drift tools are currently being replaced by newer electronic drift indicators. Thus, the industry has a need for a cost effective tool that can send inclination information to the surface without requiring the stopping of the drilling operation and the running of the wireline tool into the wellbore. A "real-time" tool that could replace wireline tools would have to be compact, relatively inexpensive, be robust and have a long operational life.

It is an object of the present invention to provide a cost effective system for communicating downhole directional information to the surface.

It is another object of the present invention to improve the existing use of the float valve (i.e. the reverse flow functionality) by imposing a pressure release encoding system.

It is another object of the present invention to provide a system and method that does not require significant modification of the drilling sub, which is already employed in the BHA.

It is a further object of the present invention to provide a pressure release encoding system and method, which minimizes the amount of power for the transmission of pressure information to the surface.

It is a further object of the present invention to provide a system and method whereby downhole conditions can be monitored in a relatively real-time manner at a surface location.

It is a further object of the present invention to make use of shock and movement sensors to allow the tool to automatically activate when in a borehole and automatically shut down when not needed, such that surface communication to the tool is not required prior to running the tool down hole.

It is a further object of the present invention to the extend battery life of the system by making use of the oil rig mud pumps as the primary energy source of the pressure release encoded system, thus enabling the system of the present invention to progressively release the pressure across the float valve in an energy efficient manner.

It is a further object of the present invention to use a hydraulic brake with a solenoid pilot valve as a control and a differential pressure sensor as a control feedback to accurately dictate the desired differential pressure drop across the float valve.

It is a further object of the present invention to use a pressure sensor within a hydraulic brake to detect the starting of the rig mud pumps.

It is a further object of the present invention to use a hydraulic brake, a single pressure sensor and solenoid pilot valve control to derive a desired differential pressure across the float valve.

It is a further object of the present invention to use a hydraulic brake, pressure sensor and solenoid pilot valve control to derive a predetermined differential pressure across the float valve independent of fluid density and fluid velocities.

It is a further object of the present invention to use a return spring within the hydraulic brake to close the main valve once the drilling interval has been completed and the mud pumps are turned off.

These and other objects and advantages of the present invention will become apparent from a reading of the attached specification and appended claims.

BRIEF SUMMARY OF THE INVENTION

The present invention is a system for communicating downhole information through a wellbore to a surface location. This system comprises a valve for providing a flow restriction to fluid passing in the wellbore, a sensor positioned in the wellbore for sensing a downhole condition in the wellbore, a brake device being cooperative with the valve and restricting the valve from fully opening during the commencement of fluid flow in at least in two fixed positions that are a timed relation to the downhole condition sensed by the sensor, and a detector positioned at the surface location and cooperative with the fluid passing in the wellbore for providing a measurement value at the surface location correlative to the time between the changes of the pressure of the fluid in the wellbore.

The system of the present invention further includes a drilling sub interconnected between the drill collars and the drill bit. The valve and brake device are positioned within the drilling sub.

The valve includes a float valve that is mounted in the drilling sub in a manner suitable for controlling flow of drilling mud in the wellbore. The float valve is normally used for controlling only reverse flow in the BHA, which is disclosed in the prior art. The present invention utilizes a ruggedized float valve to restrict the fluid flow therethrough using a pressure release encoding system. The brake device serves to hold the float valve in at least two partially open positions to create fixed pressure drops across the valve at the commencement of fluid flow through the drilling sub. The float valve, in particular, includes a housing positioned in the drilling sub, a valve seat and valve member slidably movable in the housing with a piston stem connected to the piston of the valve and extending outwardly of the housing. The brake piston of the brake member bears on the piston stem opposite the piston of the float valve so as to impede an axial advancement of the piston of the valve so as to move the piston of the float valve in the housing in timed relation between the two positions. In particular, the brake device or brake member includes an actuatable brake piston movable between a first fixed position and a second fixed position representing two predetermined fixed pressure drops across the valve.

A pumping means is positioned at the surface location for pumping drilling mud into the wellbore. The detector serves to detect a change of pressure of the drilling mud. A logic system correlates the sensed time between the changes of pressure to the downhole condition. A display serves to provide a generally real-time humanly perceivable indication of this downhole condition.

In the preferred embodiment of the present invention, the sensor is an inclination sensor for sensing an angle of inclination of the drilling sub. It is this angle of inclination of the drilling sub, which is the downhole condition of well bore inclination. The logic system serves to correlate the sensed time between pressure drops to the angle of inclination.

The present invention includes the pressure release encoding system using a method of communicating within a wellbore that comprises the steps of: (1) sensing a quiet downhole condition corresponding to a non-pumping and non-drilling rig operation; (2) sensing a quantifiable downhole condition; (3) sensing the commencement of mud flow due to the starting of the mud pumps (4) forming a flow restriction within the circulation system in the wellbore; (5) using a brake device to govern the quantified pressure restriction of the drilling mud in the circulation system; (6) measuring the force at the brake control device proportional to the differential pressure across the flow restriction; (7) using a brake control means to form a predetermined first steady state flow restriction; (8) releasing a first percentage of the pressure within the flow restriction at a first time; (9) releasing a second percentage of the pressure within the flow restriction at a second time such that the time between the first time and the second time is correlative of the downhole conditions; and (10) determining the downhole condition at a surface location by sensing the time between the changes of pressure; and (11) increasing the flow restriction to the original state when the flow through the flow restriction has returned to zero.

In the method of the present invention, the valve means is a ruggedized float valve positioned in the fluid passageway in the drilling sub. The float valve creates the flow restriction. Additionally, a hydraulic brake is positioned in the drilling sub such that a hydraulic brake piston cooperates with the float valve piston rod. The hydraulic brake piston is controlled via a solenoid pilot valve allowing a processor command to release the float valve to a partially open static position corresponding to a desired pressure drop across the float valve. After a pre-determined steady state pressure has been established across the float valve, the float valve is allowed to further open to a first fixed position and then a second fixed position so as to cause the float valve to release the first percentage of pressure and the second percentage of pressure. The step of detecting includes measuring a time between the release of the first percentage of pressure and the release of the second percentage of pressure and then correlated this time to the downhole condition.

In the preferred method of the present invention, the step of sensing includes sensing an angle of inclination of a drill bit within the wellbore. A time value is assigned to the sensed angle of inclination. The brake allows the float valve to open to a first fixed position and the second fixed position at a time equal to the assigned time value.

These and other objects and advantages of the present invention will become apparent from a reading of the attached specification and appended claims.

DETAILED DESCRIPTION OF THE INVENTION

Figures 1, 2:
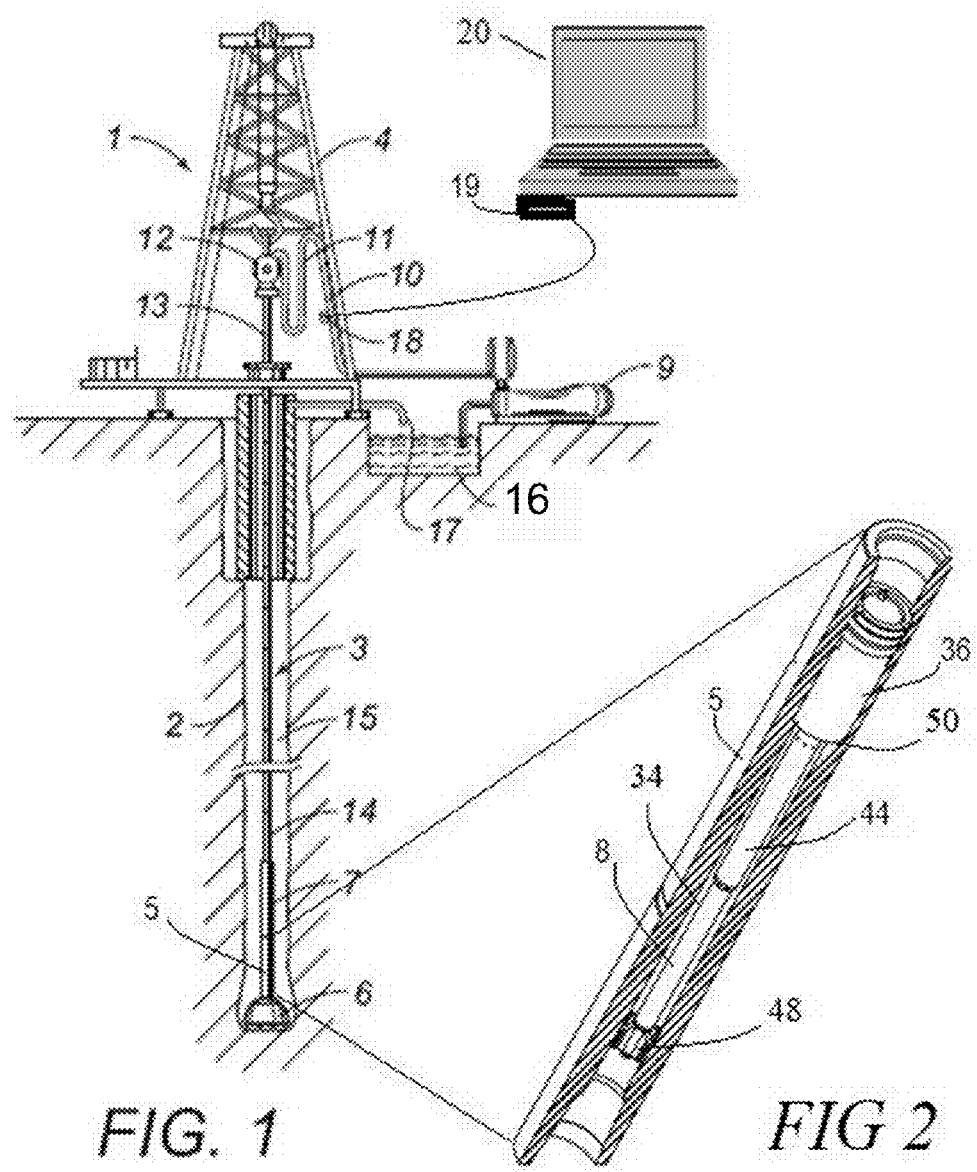
FIG. 1 is a schematic view illustrating the system of the present invention in association with components of a conventional drilling rig, showing the relative location of the present invention.
FIG. 2 is a partial sectional view, showing the drilling sub and present invention in relation to the drill string.
Figure 5:
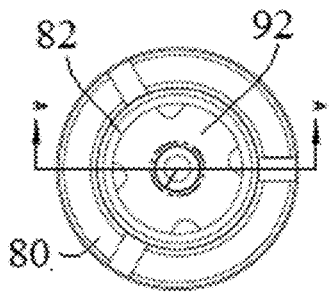
FIG. 5 is a top plan view of the float valve of FIG. 4.

FIG. 1 illustrates the system 1 of the present invention, including a conventional drilling rig located at a site above the borehole 2. The drill string 3 is supported by the derrick 4 and includes drill collars 7 and a drill bit 6. A float valve 36 resides inside the drill sub 5. The system 1 includes a downhole electronics module 8 also resides inside the drill sub 5 and includes a hydraulic brake 80, an inclination sensing device and a processing device. The downhole electronics module 8 is described in greater detail in FIG. 2.

The system 1 includes a pumping means, usually comprised of a drilling rig with a mud pump system. The flow of the mud pump system is generated by mud pumps 9 through the stand pipe 10, the mud hose 11, the swivel 12, the kelly 13, down the drill pipe 14, through the drill collars 7 and drill sub 5. Mud then exits out through the drill bit 6 and travels up the annulus 15 of the wellbore 2 to the surface where it is carried back to the mud pit 16 by way of a conduit 17.

The pressure of the mud that passes through the mud pump system is monitored by a pressure sensor 18 at the surface location, which is mounted on the stand pipe 10. The pressure sensor 18 conveys the pressure of the mud pump system to a surface computer 20 via a wired interface box 19.

The downhole electronics module 8 of the present invention measures the wellbore inclination every time the mud pump 9 transitions from an on-state to an off-state creating a quiet downhole environment to record the inclination measurement. All information gathered by the electronics module tool 8 will be saved to the internal memory of the electronics module 8. This information can be retrieved later after the downhole electronics module 8 is brought to the surface. In the present invention, when specifically directed, the information gathered by the downhole electronics module 8 is communicated via the pressure sensor 18, through the wired interface box 19, to the surface computer 20, through the mud pump system by way of a pressure release communications method. This innovative pressure release communications method is initiated when the mud pump system is turned on and the resulting flow through the downhole electronics module 8 is detected.

The present invention enables the downhole electronics module 8 to automatically activate and de-activate according to the status of the pumping means. The information can be provided by the downhole electronics module 8 at either time without the need to retrieve the module 8 upon every stop and start. On the next off-cycle of the pumps of the mud pump system, the downhole tool 8 measures the wellbore inclination and activates the pressure transducer that detects the start of the mud flow through the float valve 36. A hydraulic brake restricts the opening of the float valve 36 in a controlled routine dictated by electronics system 34. On the next on-cycle of the pumps of the mud pump system, pressure will be generated across the float valve 36 because of its restricted movement. The mud pump system will also generate a pressure observed by the surface computer 20 by way of the interface box 19 to the pressure sensor 18 mounted on the stand pipe 10.

The hydraulic brake 44 also contains a pressure sensing device. Once the downhole electronics module 8 has established a stable pressure across the float valve 36, it will release the hydraulic brake 44 so as to allow the float valve 36 to partially open. When a portion of the pressure across the float valve 36 has been released, the downhole electronics module 8 will reactivate the hydraulic brake 44 so as to stop the opening of float valve 36. This reduction of pressure across the float valve 36 will be seen throughout the mud pump system and will be transmitted to the surface computer 20 via interface box 19 and pressure transducer 18 on the stand pipe 10.

After a period of time that is proportional to the inclination of the wellbore 2, and as described hereinafter, the downhole electronics module 8 will deactivate the hydraulic brake 44 so as to allow the remaining pressure across the float valve 36 to be released. This second release of pressure will be seen at the surface computer 20 just as the first release of pressure was observed by the surface computer 20. The time between the first release of pressure across the float valve 36 and the second release of pressure across the float valve 36 is proportional to the inclination of the wellbore 2. This time between pressure releases is measured by the surface computer 20. This information is used to calculate the inclination of the wellbore and is displayed to an operator.

FIG. 2 is a cut-away view showing the drilling sub 5 that is secured to an end of the drill collars 7 and drill string 14. The drilling sub 5 includes an interior passageway 34 extending axially longitudinally therethrough. A float valve 36 is positioned to one end of the drilling sub 5 within the fluid passageway 34 as the valve means of the present invention. The float valve 36 itself is a modified float valve that is commonly used on drilling subs in the prior art. As such, the present invention does not significantly modify the basic construction of the drilling sub 5 or a particular float valve 36. However, in the present invention, the system includes a downhole electronics module 8 including a float valve 36 and a hydraulic brake 44 placed within the fluid passageway 34 so as to provide a proper action onto the float valve 36 so as to allow changes of pressure in the drilling mud to be provided in timed relation to the downhole condition. This arrangement is not disclosed by the prior art.

The drilling sub 5 has a threaded connection at one end and another threaded connection at an opposite end. One connection is suitable for joining with the drill bit the opposite threaded connection is suitable for joining with the drill collars. The float valve 36 is positioned on a hanger seat 50 a conventional bore back machined in the internal diameter of drilling sub 5. This method securing float valve 36 and sealing the float valve 36 with seals 50 within drilling sub 5 is commonly used in the prior art.

The downhole electronics module 8 is assembled with an actuator section 44 and a stabilizer/centralizer 48 positioned at one end of the electronic section 34 opposite the hydraulic break 44. A hanger 50 serves to position downhole electronics module 8 in alignment with the float valve 36. Within the concept of the present invention, the determination of the downhole condition can be easily accomplished by installing the downhole electronics module 8 within a conventional or slightly modified drill sub 5.

Figure 3:
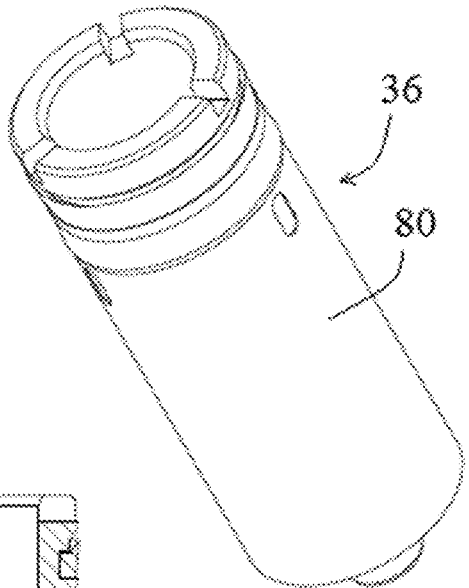
FIG. 3 is a detailed perspective view of the valve means of the present invention.

FIG. 3 is a more detailed three-dimensional illustration of valve means or flow valve assembly 36 of the present invention. The preferred embodiment of the invention utilizes a strengthen flow or float valve 36 assembly above conventional flow or float valves to allow for the additional forces and wear demands associated with the controlled flow restrictions demanded by the invention. A standard flow valve housing form has been improved. A ceramic seat lining 82 protects the valve housing from erosion when fluid passes along opening 100 through the float valve housing 80. Valve poppet 92 can slide axially and outwardly from seat 82 via shaft 88 within ceramic bushings 98 and 99 held in association with valve housing 80. Upper ceramic bushing 98 and lower ceramic bushing 99 centralize shaft 88 from potentially damaging vibrations caused by the forces resulting from restricting flow through aperture 100.

Figures 4, 6:
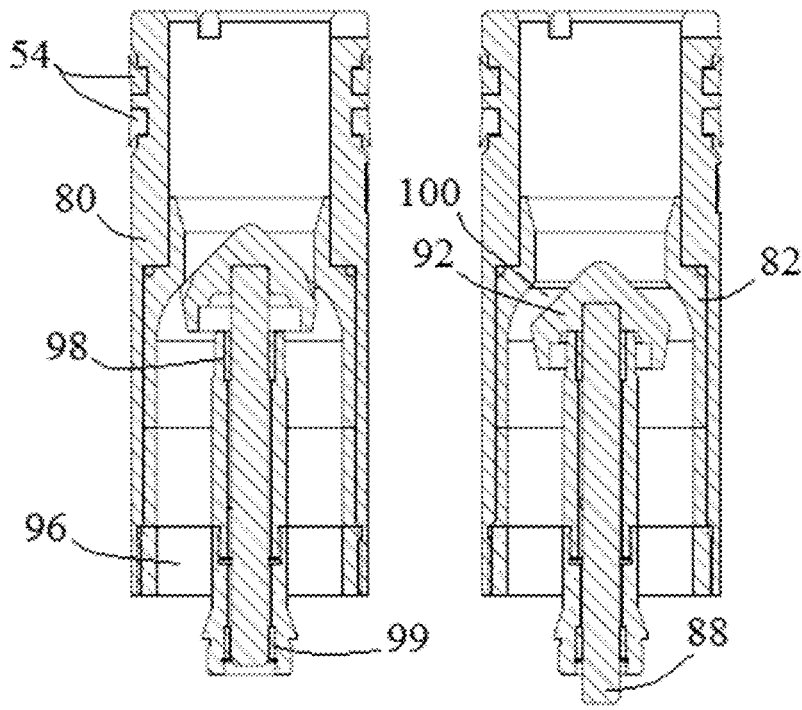
FIG. 4 is a cross-sectional view of the float valve in a closed attitude.
FIG. 6 is a cross-sectional view of the float valve in a semi-open attitude.

FIG. 6 is a cross sectional illustration of float valve 36 with valve 92 in a semi open position in relation to seat 82 within float valve housing 80. Valve shaft 88 associated with poppet 92 is displaced outwardly from valve adaptor 96 when poppet 92 is displaced off its seat due to flow through aperture 100.

FIG. 4 is a cross sectional illustration of float valve 36 with valve 92 in a closed position in relation to seat 82 within float valve housing 80. FIG. 3 shows an end view of the float valve 36.

Figure 7:
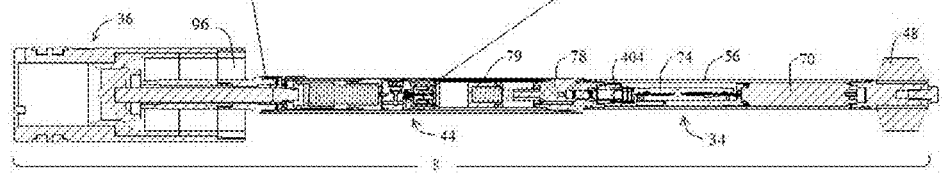
FIG. 7 is a cross-sectional view of the present invention, showing the float valve, hydraulic brake, electronics system and end centralizer.

FIG. 7 is cross-sectional view of a portion of the downhole electronics module 8 in accordance with the teachings of the preferred embodiment of the present invention. There is an electronic section 34, the hydraulic brake section 44 and a float valve 36. The stabilizer/centralizer 48 is provided at one end of the downhole electronics module 8. It is this hydraulic brake section 44 which serves to impart the necessary action onto the float valve 36 so as to allow the present invention to carry out its intended purpose.

Figure 8:
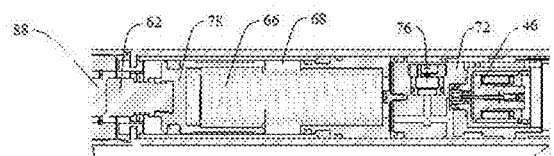
FIG. 8 is an exploded and isolated cross-sectional view of the hydraulic brake of FIG. 7.

FIG. 8 illustrates an expanded cross-sectional view of the hydraulic brake means 44 for further clarification of the preferred embodiment of the invention. The hydraulic brake 44 includes a generally tubular body 56 extending longitudinally from the stabilizer/centralizer 48 at one end to the float valve 36 with adaptor 96 at the opposite end. The hydraulic brake section 44 includes the hydraulic actuator piston 78 fixed to piston rod 62 extends outwardly of brake housing 44. The piston rod has end 62 suitable for abutting the piston stem 88 of the float valve 36 (in the manner to be described hereinafter). Piston 78 has hydraulic oil 68 inserted rearwardly within the interior of the hydraulic chamber of section 44.

A control manifold 72 uses a solenoid pilot valve 76 to control the flow of oil through the manifold 72. When piston 62 is pushed by the poppet shaft 88 of float valve 36, oil 68 is displaced through manifold 72 via solenoid control valve 76. A solenoid control valve 46 is positioned within the manifold. If control valve 46 is closed, oil 68 will be prevented from flowing through manifold 72, hydraulically locking piston 62 and poppet shaft 88 from moving in the presence of mud flow through float valve 36.

Hydraulic brake 44 is hydraulically compensated via compensating piston 79 that moves accordingly and compliantly with piston 78. A return spring 66 is incorporated into the space 68 so as to return the hydraulic brake piston 78, and float valve 36 into its retracted position when fluid flow through float valve 36 has ceased.

A differential pressure transducer 76 is housed in manifold 72 to measure the differential pressure across manifold 72. The electronic section 34 includes a battery assembly 70 located within the interior of the electronic section 34. An inclination sensor 404 is placed adjacent to the electronics 74 and rearwardly of the hydraulic brake section 44. A high-pressure electrical bulkhead 78 will be positioned between the actuator section 44 and the electronic section 34.

In the present invention, the inclination sensor 404 is of a type presently available and utilized within the prior art. The electronics 74 are similarly available in the prior art. The electronics will process the information from the inclination sensor 404 so as to provide an output that would indicate the orientation of the drill bit within the wellbore. However, unlike the prior art, the system of the present invention has electronics 74 suitably connected to solenoid valve 46. As such, the electronics 74 of the present invention will serve to hydraulically control the reseeding of the piston 78 to a first position and a second position in timed relation. The timed relation can be based upon the angular inclination of the drill bit. For example, the movement between the first position and the second position can be a one second interval if the angular inclination is one degree. Alternatively, if the angular inclination is two degrees, then the interval between the movement of the first reseeded position and the second further reseeded position of the hydraulic brake 78 can be two seconds. Still further, if there is a five degree angle of inclination, then the time interval between the first reseeded position and the second further reseeded position can be five seconds. As will be described hereinafter, these controlled restrictions of float valve opening will cause pressure static pressure changes in the drilling mud that can be sensed from the surface location. As such, if the pressure changes would occur two seconds apart, then the operator would know that there was a two degree angle of inclination. Various fractional angles can also be conveyed in a similar manner from the downhole condition to the surface location. All of the electronics are self-contained within the downhole electronics module 8. As a result, no wireline connections are necessary to the surface location and no telemetry systems are required.

FIGS. 7 and 8 illustrate the operation of the downhole electronics module 8, also referred to as the downhole tool, in the preferred embodiment of the invention. The downhole tool can take a survey during the normal rig operation of connecting an additional drill pipe. Then, the rig pumps are turned off the fluid flow through a valve means, such as a flow valve 36, ceases, the resulting axial force from the poppet shaft 88 and hydraulic brake piston shaft 62 is reduced allowing spring 68 to return the float valve to a closed position. Tool electronics system 74 measures the inclination of the system via inclination sensor 404. The inclination measurement is stored in the electronics system 74 memory. When the mud pumps are started the resulting flow through float valve 36 starts to move oil through the open solenoid valve 46 housed in manifold 72. The resulting initial pressure in oil 68 is measured by pressure transducer 76 and processed by electronics system 74. The micro controller system in electronics system 74 now having detected the commencement of flow due to the starting of the rigs pumps, energizes solenoid valve 46 sealing oil flow through manifold 72. As such, rearward movement of the piston 78 is hydraulically blocked preventing the further opening of float valve 36. The simple impeding of this axial movement requires a minimum of energy. The pressure drop across partially open float valve 36 increases as the fluid flow rises. The differential pressure drop across float valve 36 can be measured by the single pressure transducer 76 downstream of float valve 36 via the resulting proportion force in shaft 88 conveying to the same force in shaft 62 and piston 78. Piston 78 loads oil 68 forming a hydraulic pressure within the oil in the brake chamber. The pressure drop across float valve 36 can be controlled during the commencement of flow to a predetermined pressure drop across the valve. Electronics 74 micro controller switches the electrical drive to hydraulic brake solenoid pilot valve 46 in a control routine cooperative with pressure sensor 76 to reach the predetermined pressure drop across float valve 36.

After electronics system 74 and pressure sensor 76 have established that a first predetermined stable static pressure has been reached, electronics system 74 will open the solenoid pilot valve allowing hydraulic oil 68 to flow through manifold 72. Piston 78 can then axially move allowing the mechanically coupled float valve 36 to open further, until electronics system 74 and pressure sensor 76 have established a second predetermined stable static pressure. This second pressure is controlled by electronics system 74 to be a programmable percentage of the first predetermined pressure. After a period of time proportionally corresponding to the prior recoded inclination measurement, electronics system 74 will open the solenoid pilot valve 46 allowing flow valve 36 to fully open.

Under certain circumstances, it may be necessary to incorporate three or more movements to the piston 78 so as to accurately and properly convey information pertaining to the downhole condition to the surface location.

Figure 9:
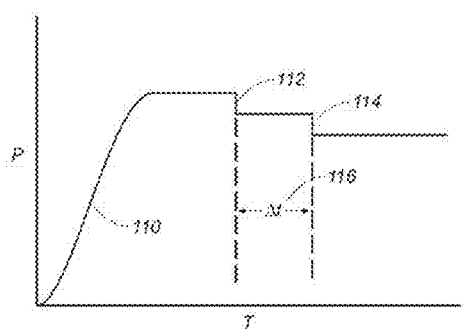
FIG. 9 is a graph illustration, showing the sensing of timed pressure changes.

FIG. 9 illustrates the manner in which the pressure release encoding of the present invention relates to the change of time of pressure changes conveyed to the surface. In FIG. 9, the horizontal axis represents time while the vertical axis represents pressure. Line 110 is illustrated as pressure building up in the system. This build-up of pressure occurs when the piston 92 is seated within its seat 82 in float valve 36. Eventually, when the system pressure has equalized, the pressure will level out. When the piston opens, in the manner of FIG. 6, a pressure drop 112 will occur. When the piston opens further, another pressure drop 114 occurs. Since the cause of the pressure drops is the relay of information from the sensor, through the electronics, to the hydraulic brake, and, in turn, to the stem 88 of the piston 92, the time of these pressure changes, represented by delta t 116 is correlative of the downhole condition. As stated previously, and merely as an example, if the delta t is two seconds, then the surface location will know that the drill bit has two degrees of deviation. If the delta t is 3.25 seconds, then the surface location will know that the change of orientation is 3.25°. It is believed that the system of the present invention can also be adapted to various other downhole sensor tools. In the present invention, the amount of pressure change is not very important. It is only the existence of the pressure change which is important to monitor. As such, the time between the pressure changes (regardless of the amount of pressure) provides the necessary information to the operator at the surface so as to determine the downhole condition.

Figure 10:
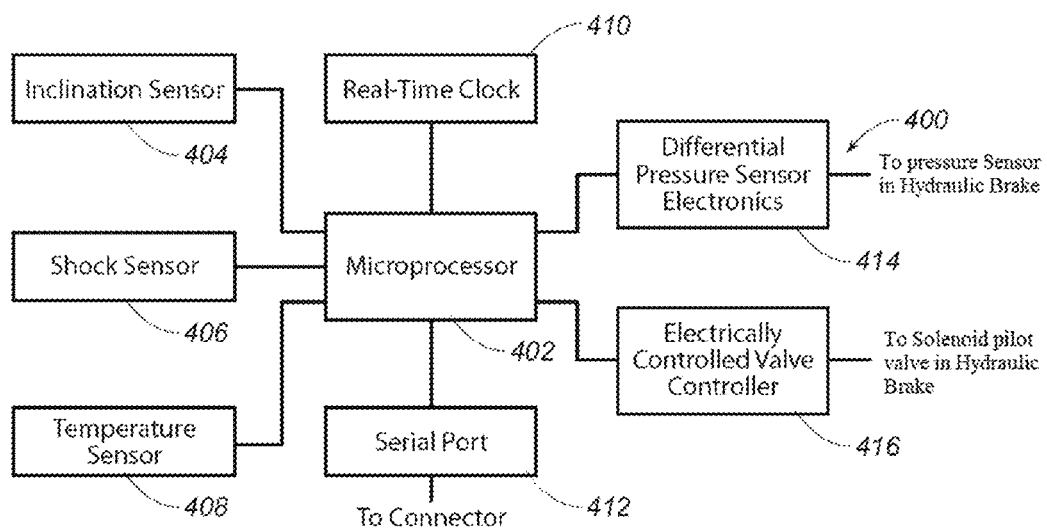
FIG. 10 is a block diagram of the microprocessor-based electronics section of the downhole tool of the present invention.

FIG. 10 shows the microprocessor-based electronic system 400 of the downhole electronics module 8. This electronic system 400 includes a microprocessor 402, an inclination sensor 404, a shock sensor 406, a temperature sensor 408, a real-time clock 410, and a serial port 412 in order to communicate outwardly of the downhole tool. The electronic system 400 also includes differential pressure sensor electronics 414 and an electrically-controlled solenoid valve controller 416. Solenoid pilot valve 46 and the pressure sensor 76 are wired to the controller and are both incorporated in manifold 72 within hydraulic brake 44.

The downhole electronics module 8 is mounted in the drill sub 5 in the manner shown in FIG. 2. When the pumps 9 in the mud pump system are turned on, drilling mud is forced down the drill string 3 into the drill sub 5 and around the downhole electronics module 8 before exiting out the drill bit 6 and returning to the surface mud pits 16 by way of the annulus 15 of the wellbore 2. Shock sensor 406 detects the shock and vibration associated with the rotary drilling of drill bit 6 cutting formation 2. When the drilling stops shock sensor 406 turns off. This stoppage wakes the microprocessor 402 from a low powered sleep state. When the microprocessor 402 wakes up, it reads the inclination from the inclination sensor 404, the temperature from the temperature sensor 408, and the present time from the real-time clock 410. This information is stored in the electronic memory and can be retrieved at a later time by way of the serial port 412 when the downhole tool is at the surface.

After storing this information into memory, microprocessor 402 will monitor differential pressure sensor 76 via the sensor electronics 414 to detect the commencement of mud flow as described previously. Once mud flow has been detected microprocessor 402 will initiate the pressure release communication procedure also described in section (21). Once the pressure release communication procedure has been conducted the microprocessor 402 will return to its low power sleep state until the next quite event associated with the cessation of the drilling process.

The system and method of the present invention provides a cost effective system for communicating downhole directional information to the surface. The present invention does not require separate deployment to take measurements, and the automation of the stopping and starting within the drill sub enables more efficient operation of conventional wells. The use of shock and movement sensors allow the downhole electronic module to automatically activate when in a borehole and automatically shut down when not needed, such that surface communication is not required prior to running. The activation of the mud pumps can start the readings of the downhole condition without any separate need to activate the system. The present invention uses a pressure sensor within a hydraulic brake to detect the starting of the rig mud pumps. The downhole electronics module has a return spring within the hydraulic brake to close the main valve once the drilling interval has been completed and the mud pumps are turned off.

The system and method of the present invention effectively incorporates existing elements of drilling rigs. The pressure release encoding system also increases the usefulness of existing float valves, which can be efficient adapted for the innovative method of the present invention. Furthermore, the system and method does not require significant modification of the drilling sub, which is already employed in the BHA. The system and method still allow monitoring of the downhole condition in a relatively real-time manner at a surface location.

The present invention improves energy and power usage. The pressure release encoding system minimizes the amount of power for the transmission of pressure information to the surface. Only a small amount of power is needed for the downhole module or tool of the present invention itself. The battery life of the system is extended by making use of the oil rig mud pumps as the primary energy source of the pressure release encoded system, thus enabling the system of the present invention to progressively release the pressure across the float valve in an energy efficient manner.

The system and method of the present invention disclose a hydraulic brake means, solenoid pilot valve, and only a single pressure sensor in an innovative manner. These elements control feedback to accurately dictate the desired differential pressure drop across the float valve and derive a desired differential pressure across the float valve. The single sensor in the drilling sub is an important innovation over the prior art systems with at least two sensors. The installation of two pressure sensors, sometimes on both sides of a valve means is no longer required by the present invention. Previously, the technology required two pressure transducers positioned physically below and above the pressure restriction, such as the main valve and seat. The hydraulic brake, pressure sensor and solenoid pilot valve control also derive a predetermined differential pressure across the float valve independent of fluid density and fluid velocities.

The foregoing disclosure and description of the invention is illustrative and explanatory thereof. Various changes in the details of the illustrated construction or in the steps of the described method may be made within the scope of the appended claims without departing from the true spirit of the invention. The present invention should only be limited by the following claims and their legal equivalents.

I claim:

1. A system for communicating downhole information through a wellbore to a surface location comprising:
    a drill string with a drilling sub at an end thereof;
    a pumping means for pumping drilling mud into the wellbore, said drilling mud being fluid, said pumping means being positioned at the surface location and being in fluid connection with said drill string with said drilling sub; and
    a downhole electronics module positioned in said drilling sub, said downhole electronic module comprising:
        a valve means for providing a flow restriction to fluid passing through said drilling sub, said valve means being suitable for controlling a flow of drilling mud in said drilling sub;
        a sensor means positioned in the drilling sub for sensing a downhole condition in the wellbore;
        a brake means cooperative with the valve means for fixing said valve means in at least two static positions, during a start of said flow of drilling mud through said drilling sub and during opening of said valve means; and
        a detector means positioned at the surface location and cooperative with the fluid passing through said drilling sub for providing a measurement value at the surface location correlative to time between changes of pressure of the fluid in the drill string.

2. The system of claim 1, wherein said sensor means is comprised of an inclination sensor means, being housed within the drill sub and aligned with said wellbore and sensing an angle of inclination of said wellbore.

3. The system of claim 1, said valve means comprising:
    a housing positioned in said drilling sub;
    a piston slidably movable in said housing; and
    a piston stem connected to said piston and extending outwardly of said housing, said brake means acting on said piston stem so as to fix said piston in said housing in timed relation between the static positions.

4. The system of claim 3, said brake means comprising:
    an actuator piston bearing on said piston of said valve means so as to impede an axial advancement of said piston stem.

5. The system of claim 4, wherein said actuator piston is movable between a first stationary position and a second stationary position.

6. The system of claim 4, said brake means further comprising:
    a return spring being engaged to said actuator piston;
    a differential pressure transducer, being positioned against said actuator piston;
    a solenoid pilot valve means in communication with the pressure transducer;
    a hydraulic fluid chamber, engaged to said solenoid valve means; and
    a compensating piston, being actuated by said hydraulic fluid chamber.

7. The system of claim 1, said detector means comprising:
    a logic means for correlating a sensed time between controlled static pressure drops across the valve means to the downhole condition; and
    a display means for providing a generally real-time humanly perceivable indication of the downhole condition.

8. The system of claim 7, said sensor means being an inclination sensor means for sensing an angle of inclination of said drilling sub in the wellbore, said inclination sensor means being aligned with said wellbore, said logic means for correlating said sensed time with said angle of inclination.

9. The system of claim 1, said brake means being a hydraulic brake and being comprised of a hydraulic chamber filled with oil, a sliding piston, a return spring and a control means for preventing displacement of oil when said sliding piston pushes against said oil.

10. The system of claim 9, wherein said control means is comprised of a solenoid-operated pilot valve and manifold.

* * * * *

UNITED STATES PATENT AND TRADEMARK OFFICE
CERTIFICATE OF CORRECTION

| | | |
|---|---|---|
| PATENT NO. | : 7,881,155 B2 | |
| APPLICATION NO. | : 12/685602 | |
| DATED | : February 1, 2011 | |
| INVENTOR(S) | : David Close | |

It is certified that error appears in the above-identified patent and that said Letters Patent is hereby corrected as shown below:

Title page, delete Title page and replace with new Title page with 11 Claims, 4 Drawing Sheets. (attached)

Claims:
Column 16, after line 5, please add:

11. A system for communicating an angle of inclination of a bore hole during a downhole drilling operation to a surface location comprising:
  a drill string extending in a wellbore and having a drill bit;
  a drilling sub connected to said drill string in said wellbore, the drill bit being interconnected to said drill string, the drilling sub having a fluid passageway therein; and
  a downhole tool within said drilling sub, said downhole tool comprising:
  a valve means positioned in said drilling sub for providing a flow restriction in said fluid passageway;
  a brake means cooperative with said valve means and positioned within said drilling sub, said valve means comprising a float valve mounted in said drilling sub suitable for controlling a flow fluid in said wellbore, said brake means for moving said float valve between at least two positions;
  an inclination sensor means positioned in said drilling sub, said inclination sensor means for determining inclination of the bore hole via pressure measurement at said drilling sub, said inclination sensor means connected to said brake means, said brake means for acting on said valve means so as to restrict opening of said valve means, causing a differential pressure drop across said valve means, said valve means being opened by said brake means to release a first percentage of a fluid pressure through said flow restriction and a second percentage of the fluid pressure through said flow restriction in timed relation, the timed relation being correlated to the inclination of the drill bit; and
  a detecting means positioned at the surface location for detecting change of fluid pressure and the timed relation therebetween so as to provide an indication of the bore hole by inclination measurement in said drilling sub,
  wherein said valve means is a float valve, said float valve comprising:
  a housing positioned in said drilling sub;

Signed and Sealed this
Sixteenth Day of February, 2016

Michelle K. Lee
*Director of the United States Patent and Trademark Office*

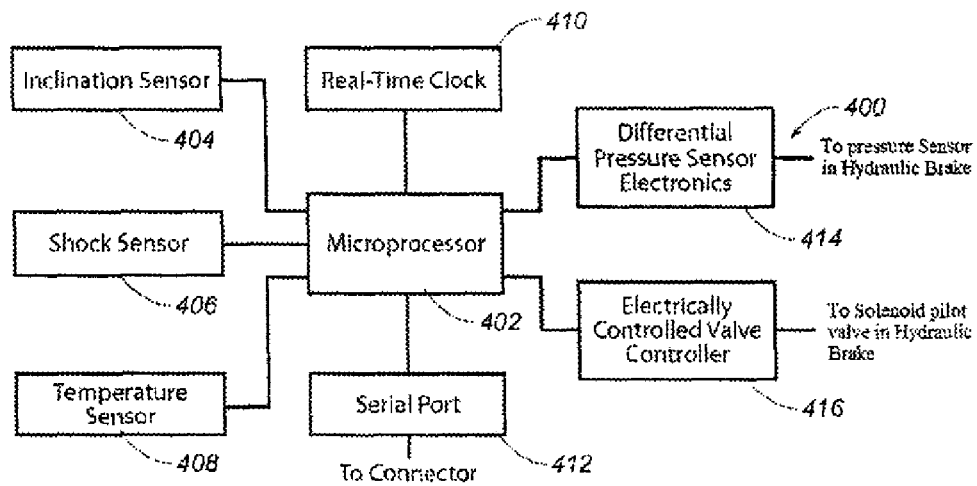

Claims:
Claim 11, column 16 a piston member slidably movable in said housing; and
a piston stem connected to said piston and extending outwardly of said housing, said brake means acting on said piston stem so as to impede movement of said piston member in said housing in timed relation between the two positions, and
   wherein said brake means comprises an actuator piston movable between a first position and a second position, said actuator piston bearing on said piston stem opposite said piston member of said float valve so as to impede an axial movement of said piston stem.

CERTIFICATE OF CORRECTION (continued)

(12) United States Patent
Close

(10) Patent No.: US 7,881,155 B2
(45) Date of Patent: Feb. 1, 2011

(54) PRESSURE RELEASE ENCODING SYSTEM FOR COMMUNICATING DOWNHOLE INFORMATION THROUGH A WELLBORE TO A SURFACE LOCATION

(75) Inventor: David Close, Austin, TX (US)

(73) Assignee: Welltronics Applications LLC, Austin, TX (US)

(*) Notice: Subject to any disclaimer, the term of this patent is extended or adjusted under 35 U.S.C. 154(b) by 0 days.

(21) Appl. No.: 12/685,602

(22) Filed: Jan. 11, 2010

(65) Prior Publication Data
US 2010/0110833 A1 May 6, 2010

Related U.S. Application Data

(63) Continuation-in-part of application No. 11/460,180, filed on Jul. 26, 2006, now Pat. No. 7,646,310.

(51) Int. Cl.
E21B 47/16 (2006.01)

(52) U.S. Cl. .............. 367/83; 367/84; 367/85; 340/853.1; 340/854.3; 175/48; 175/61

(58) Field of Classification Search .......... 367/82–85; 340/853.1, 854.3; 175/48, 61
See application file for complete search history.

(56) References Cited

U.S. PATENT DOCUMENTS

| | | |
|---|---|---|
| 3,867,714 A | 2/1975 | Patton |
| 4,520,468 A | 5/1985 | Scherbatskoy |
| 4,562,560 A | 12/1985 | Kamp |
| 5,473,579 A * | 12/1995 | Jeter ............... 367/85 |
| 5,586,084 A * | 12/1996 | Barron et al. ..... 367/85 |
| 5,679,894 A | 10/1997 | Kruger et al. |
| 6,097,310 A * | 8/2000 | Harrell et al. .... 340/854.3 |
| 6,105,690 A | 8/2000 | Biglin, Jr. |
| 6,443,228 B1 | 9/2002 | Aronstam et al. |
| 6,691,804 B2 | 2/2004 | Harrison |
| 6,714,138 B1 | 3/2004 | Turner et al. |
| 6,898,150 B2 | 5/2005 | Hahn |
| 7,145,834 B1 * | 12/2006 | Jeter ............... 367/83 |
| 7,319,638 B2 * | 1/2008 | Collette ........... 367/83 |
| 7,417,920 B2 * | 8/2008 | Hahn et al. ....... 367/85 |

* cited by examiner

*Primary Examiner*—Albert K Wong
(74) *Attorney, Agent, or Firm*—Craft Chu PLLC; Andrew W. Chu, PC

(57) ABSTRACT

A pressure release encoding system for communicating downhole information through a wellbore to a surface location include a downhole tool with a valve for providing a fluid restriction to fluid passing in the wellbore, a sensor positioned in the wellbore for sensing a downhole condition in the wellbore, a brake cooperative with the valve for moving the valve between at least two positions in timed relation to the downhole condition sensed by the sensor, and a detector positioned at the surface location for providing a measurement value at the surface location correlative to the time between the changes of the pressure of the fluid in the wellbore. The system associates position of the valve with pressure transduction. The sensor is an inclination sensor for sensing an angle of inclination of the wellbore.

11 Claims, 4 Drawing Sheets